No. 693,311. Patented Feb. 11, 1902.
A. E. PIPER.
SHIPPING BOX.
(Application filed Oct. 3, 1901.)
(No Model.)

WITNESSES:
Geo. W. Naylor
C. R. Ferguson

INVENTOR
Asa E. Piper
BY Munn
ATTORNEYS

UNITED STATES PATENT OFFICE.

ASA E. PIPER, OF BUFFALO, NEW YORK.

SHIPPING-BOX.

SPECIFICATION forming part of Letters Patent No. 693,311, dated February 11, 1902.

Application filed October 3, 1901. Serial No. 77,397. (No model.)

*To all whom it may concern:*

Be it known that I, ASA E. PIPER, a citizen of the United States, and a resident of Buffalo, in the county of Erie and State of New York, have invented a new and Improved Shipping-Box, of which the following is a full, clear, and exact description.

This invention relates to improvements in boxes for holding and shipping produce—such, for instance, as butter—and the object is to provide a box of the knockdown variety that may be manufactured at a comparatively small cost and that will occupy but little space when opened and spread out for reshipment.

I will describe a shipping-box embodying my invention, and then point out the novel features in the appended claims.

Reference is to be had to the accompanying drawings, forming a part of this specification, in which similar characters of reference indicate corresponding parts in both the views.

Figure 1:
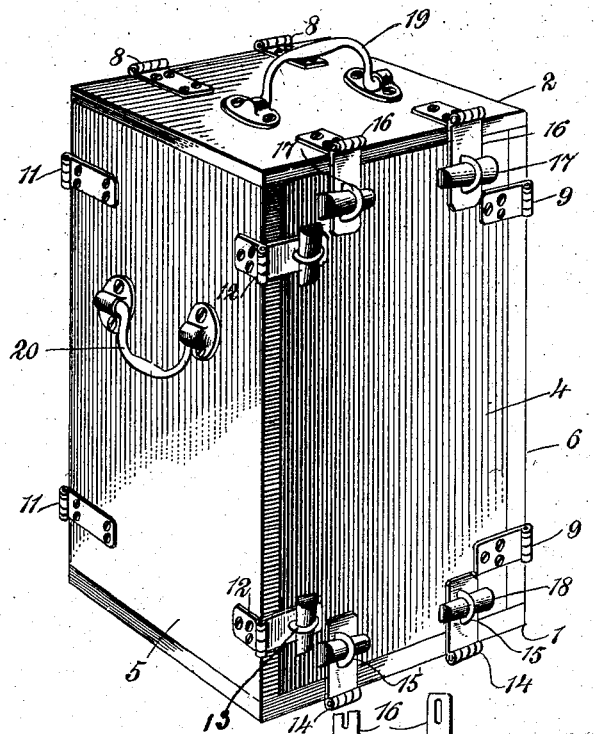
Figure 2:
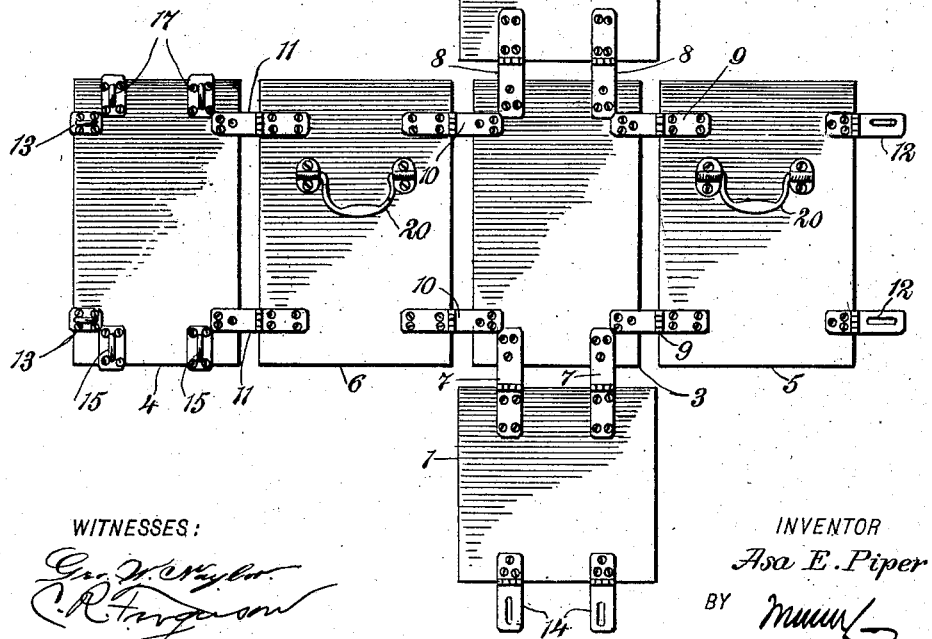

Figure 1 is a perspective view of a shipping-box embodying my invention; and Fig. 2 is a plan view thereof, showing the box as open or spread out.

The box comprises a bottom board 1, a top board 2, the opposite side boards 3 4, and the opposite side boards 5 6. The bottom board 1 has hinge connections 7 with the side board 3, and the top board 2 has hinge connections 8 with said side board 3. The side boards 5 and 6 are respectively hinged to the side board 3 by means of the hinges 9 10, while the side board 4 is connected to the side board 6 by means of hinges 11. The side board 5 is provided with hasps 12 for engaging with staples 13 on the side board 4. The bottom 1 is provided with hasps 14 for engaging with staples 15 at the lower end of the side board 4, and the top 2 is provided with hasps 16 for engaging with staples 17 on said side board 4.

When the several sections are folded together and the hasps engage with the staples, pins 18 are passed through the staples, as clearly shown in Fig. 1. The top may be provided with a handle 19, and opposite sides may also be provided with handles. I have here shown the sides 5 and 6 as provided with handles 20.

When the several sections are knocked down or spread out, as indicated in Fig. 2, for reshipment and as the several sections are of uniform thickness, it is obvious that their upper and lower sides will be in the same planes, and therefore several boxes may be packed together closely for reshipment.

In shipping butter, if desired, a lining of suitable paper may be placed in the box, and when it is desired to remove the butter it is only necessary to release the several sections and then the cake of butter may be readily cut into pound or other cakes, as desired.

Having thus described my invention, I claim as new and desire to secure by Letters Patent—

1. A shipping-box, comprising four side boards hinged together, a top board hinged to one of the side boards, a handle on the top board, a bottom board hinged to one of the side boards, hasps on one of the side boards, staples on one of the side boards for engaging with said hasps, hasps on the top and bottom boards, and staples on said side board with which said last-named hasps engage, substantially as specified.

2. A shipping-box having four side boards hinged together, a top board hinged to one of the side boards, a bottom board hinged to one of the side boards, hasps on one of the side boards, staples on one of the side boards for engaging with said hasps, hasps on the top and bottom boards, and staples on said side boards with which said last-named hasps engage, the several boards being of equal thickness, substantially as specified.

In testimony whereof I have signed my name to this specification in the presence of two subscribing witnesses.

ASA E. PIPER.

Witnesses:
EDWIN ROWLEY,
C. L. BROOKS.